(12) United States Patent
Osawa et al.

(10) Patent No.: US 7,137,665 B2
(45) Date of Patent: Nov. 21, 2006

(54) VEHICULAR SEAT APPARATUS

(75) Inventors: Shigeyuki Osawa, Tokyo (JP); Masami Handa, Tokyo (JP); Morihiro Ichisugi, Yokohama (JP)

(73) Assignees: NHK Spring Co., Ltd., Yokohama (JP); Fuji Jukogyo Kabushiki Kaisya, Tokyo (JP)

(*) Notice: Subject to any disclaimer, the term of this patent is extended or adjusted under 35 U.S.C. 154(b) by 131 days.

(21) Appl. No.: 10/969,443

(22) Filed: Oct. 20, 2004

(65) Prior Publication Data
US 2005/0109909 A1 May 26, 2005

(30) Foreign Application Priority Data
Oct. 23, 2003 (JP) ............................ 2003-363367

(51) Int. Cl.
*A47C 1/023* (2006.01)
(52) U.S. Cl. .............................. 297/344.1; 297/217.3; 248/429
(58) Field of Classification Search ................ 248/429, 248/430; 297/217.3
See application file for complete search history.

(56) References Cited

U.S. PATENT DOCUMENTS 5,797,576 A * 8/1998 Gauger ....................... 248/429
6,102,478 A * 8/2000 Christopher ............. 248/429 X
6,299,121 B1 * 10/2001 Brault ..................... 248/429 X
6,419,315 B1 * 7/2002 Hiemstra ............. 297/217.3 X

FOREIGN PATENT DOCUMENTS

| JP | 9-207638 A | 8/1997 |
|---|---|---|
| JP | 2000-280813 A | 10/2000 |
| JP | 2002-337588 A | 11/2002 |

\* cited by examiner

*Primary Examiner*—Anthony D. Barfield
(74) *Attorney, Agent, or Firm*—Frishauf, Holtz, Goodman & Chick, P.C.

(57) ABSTRACT

A vehicular seat apparatus has a first slide rail unit including a first stationary rail and a first moving rail and a second slide rail unit including a second stationary rail and a second moving rail. Load sensors are provided between the seat cushion assembly and the moving rails. The first stationary rail and the second stationary rail are connected to each other by a rigid frame. The rigid frame can maintain the relative positions of the first and second slide rail units. Body mounting leg portions provided on the rigid frame are fixed to a seat mounting portion of a vehicle body.

3 Claims, 4 Drawing Sheets

VEHICULAR SEAT APPARATUS

CROSS-REFERENCE TO RELATED APPLICATIONS

This application is based upon and claims the benefit of priority from prior Japanese Patent Application No. 2003-363367, filed Oct. 23, 2003, the entire contents of which are incorporated herein by reference.

BACKGROUND OF THE INVENTION

1. Field of the Invention

The present invention relates to a vehicular seat apparatus mounted in a vehicle such as an automobile.

2. Description of the Related Art

In an automobile that is furnished with an airbag for its passenger seat, the airbag may sometimes be expected to expand if an occupant in the passenger seat is an adult. The automobile of this type must be provided with determining means that determines whether the occupant in the passenger seat is an adult or any other one (child, child seat, or other occupant). Load sensors that are formed of strain gages, for example, are used as the determining means. The load sensors are incorporated in a seat cushion of the passenger seat. Seats of this type are described in Jpn. Pat. Appln. KOKAI Publications Nos. 9-207638, 2000-280813, and 2002-337588.

The load sensors that are formed of strain gages are located between a seat slider and a seat cushion assembly, for example. The load sensors electrically detect seating loads that act on the seat cushion assembly. In some cases, however, the outputs of these sensors may be influenced by variation in the position of the seat slider or a seat mounting portion of a vehicle body, so that the accuracy of detection of occupants may be lowered.

In a seat apparatus that is provided with load sensors, the detection accuracy of the sensors is improved by performing calibration before the seat apparatus is attached to the vehicle body. Before the apparatus is attached to the vehicle body, however, the seat slider or the frame of the seat cushion may possibly be deformed under the influence of vibration that acts on the seat apparatus during transportation, for example, the dead weight of the apparatus, etc. In this case, the sensor outputs may possibly be disturbed with the seat apparatus attached to the vehicle body despite the finished calibration.

In order to deal with this problem, a proposal has been made to attach in advance the seat apparatus to a proper jig that is equivalent to the seat mounting portion of the vehicle body during the transportation or storage of the apparatus. With use of this jig, however, it entails redundant operations, such as attachment to and removal of the seat apparatus from it, as well as additional cost.

In a seat apparatus in which left- and right-hand slide rail units are provided individually with locking mechanisms, moreover, the mounting positions of the rail units may sometimes be subject to variation. This variation may possibly cause a phase difference in locking operation between the respective locking mechanisms of the two slide rail units. Thus, the locking mechanisms of the rail units cannot operate fully synchronously, so that one of the rail units may possibly fail to be fully locked (or may be half-locked, as it is called). In this case, the friction of a locking latch member of the slide rail unit causes variation in the operating force of an unlocking or release lever (operating section).

BRIEF SUMMARY OF THE INVENTION

Accordingly, the object of the present invention is to provide a vehicular seat apparatus in which left- and right-hand slide rail units can be kept in predetermined positions.

A vehicular seat apparatus according to the invention comprises: a first slide rail unit including a first stationary rail and a first moving rail slidable in the longitudinal direction thereof with respect to the first stationary rail; a second slide rail unit including a second stationary rail located parallel to the first stationary rail and a second moving rail slidable in the longitudinal direction thereof with respect to the second stationary rail; a first locking mechanism which fixes the first moving rail in a desired position in the longitudinal direction with respect to the first stationary rail; a second locking mechanism which fixes the second moving rail in a desired position in the longitudinal direction with respect to the second stationary rail; a seat cushion assembly attached to the first and second moving rails; a rigid frame which connects the first and second stationary rails to each other to restrain relative dislocation of the first and second slide rail units; and a body mounting leg portion provided on the rigid frame.

According to this arrangement, the first and second stationary rails are connected to each other by the rigid frame that is highly rigid. The vehicular seat apparatus is attached to a vehicle body by means of the body mounting leg portion on the rigid frame. Therefore, the relative positions of the slide rail units can be maintained even before the seat apparatus is attached to the vehicle body.

Thus, the left- and right-hand slide rail units of the vehicular seat apparatus can be kept in predetermined positions. In the seat apparatus that comprises load sensors, for example, the outputs of the load sensors can be restrained from changing due to variation in the position of a seat mounting portion, deformation of the slide rail units, etc., and seating loads can be detected accurately.

In a seat slider of which the slide rail units are provided individually with locking mechanisms, the positional relationship between the slide rail units can be maintained. Thus, a phase difference can be restrained as the locking mechanisms operate, and half-locking can be prevented.

The seat apparatus may further comprise a load sensor which is provided between the seat cushion assembly and the first and second moving rails and detects vertical loads applied to the seat cushion assembly. The load sensors determine whether or not an occupant seated on the seat cushion assembly is an adult. If they conclude the occupant to be an adult, the load sensors deliver signals to a control unit to cause a passenger seat airbag to expand.

An example of the rigid frame comprises a first frame member, extending in the front-rear direction of a vehicle body along the first stationary rail and fixed to the underside of the first stationary rail, and a second frame member, extending in the front-rear direction of the vehicle body along the second stationary rail and fixed to the underside of the second stationary rail, and connecting members which extend in the crosswise direction of the vehicle body between the first and second frame members and connect the first and second frame members to each other. The first and second frame members and the connecting members are formed of a metallic square pipe each, for example.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to FIGS. 1 to 4.

Figure 1:
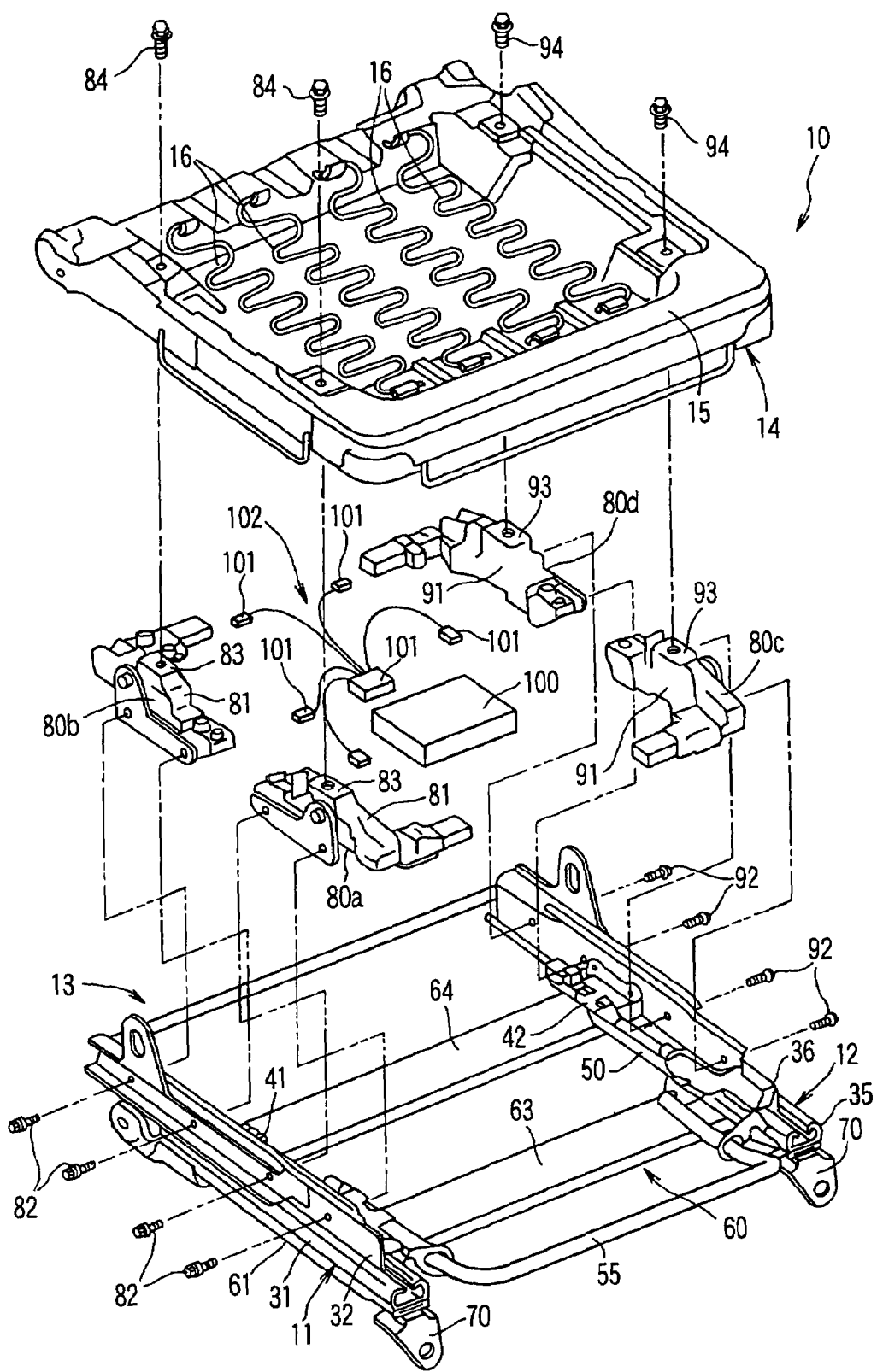
FIG. 1 is an exploded perspective view of a vehicular seat apparatus according to an embodiment of the invention.

A vehicular seat apparatus 10 shown in FIG. 1 comprises a seat slide device 13, which includes left- and right-hand slide rail units 11 and 12, and a seat cushion assembly 14. The seat cushion assembly 14 is supported by means of the seat slide device 13 so as to be movable in a front-rear direction of a vehicle. The seat cushion assembly 14 is provided with a cushion frame 15 and a spring member 16, such as an S-spring, attached to the frame 15.

Figure 2:
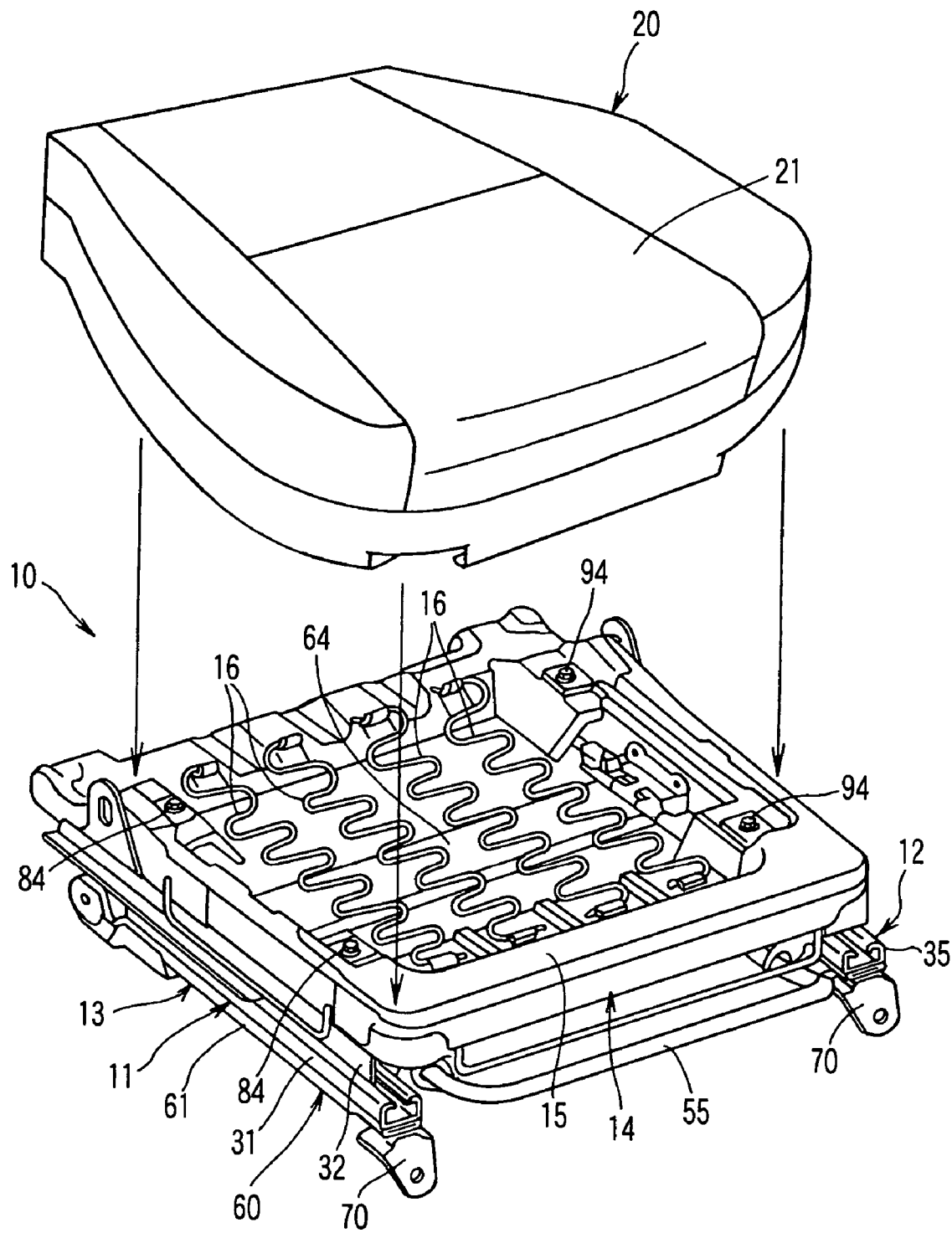
FIG. 2 is a perspective view showing the vehicular seat apparatus of FIG. 1 and a cover assembly.

As shown in FIG. 2, a cover assembly 20 is provided on the top side of the seat cushion assembly 14. An example of the cover assembly 20 is composed of a pad (not shown) and an outer covering 21 of a fabric or the like that covers the pad. The pad is formed of an elastic material such as urethane.

The seat slide device 13 comprises the first slide rail unit 11 on the left-hand side of FIG. 1 and the second slide rail unit 12 on the right-hand side. The first slide rail unit 11 includes a first stationary rail 31 and a first moving rail 32. The first moving rail 32 is slidable in its longitudinal direction with respect to the stationary rail 31.

Figure 3:
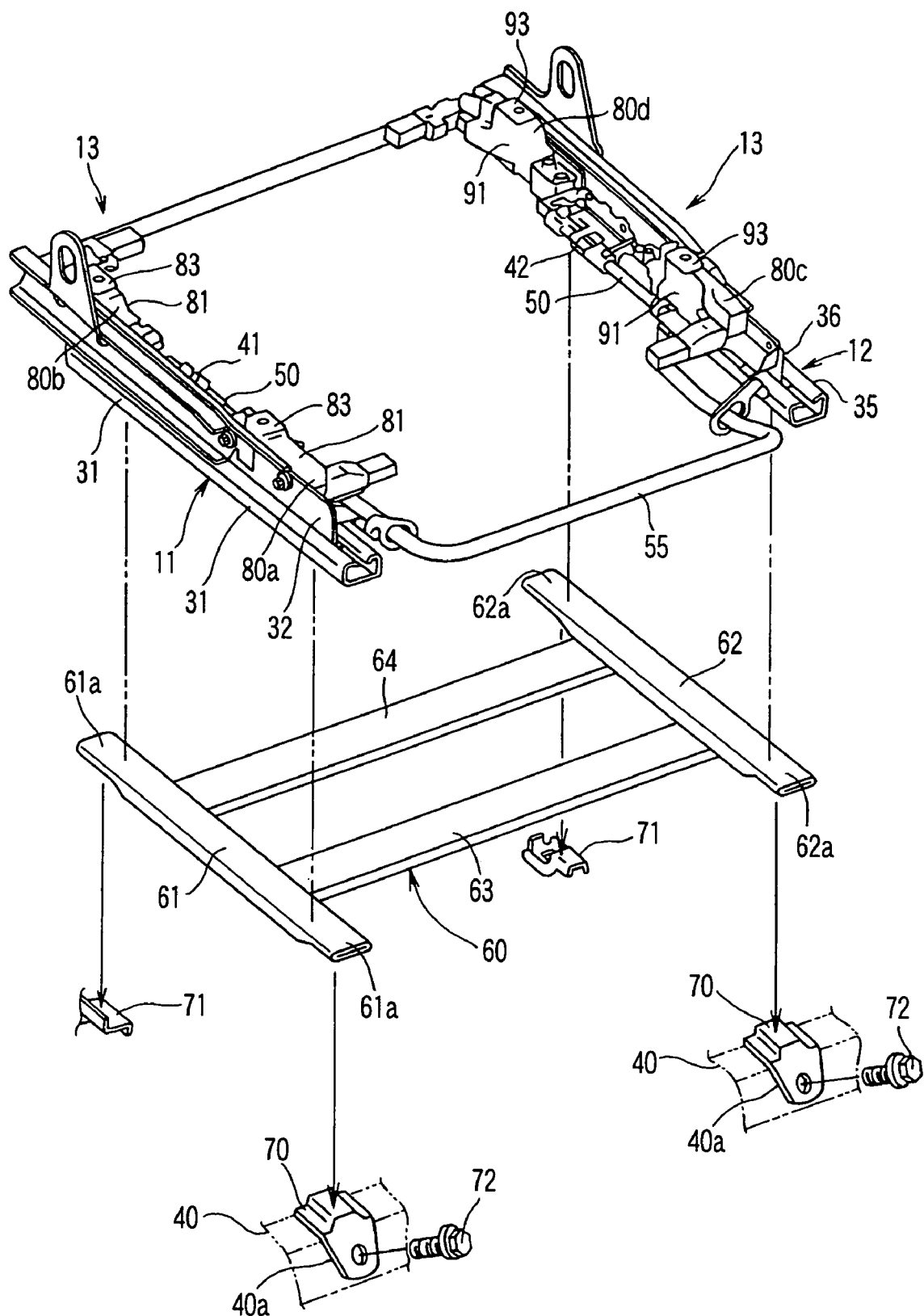
FIG. 3 is a perspective view showing slide rail units, a rigid frame, and body mounting leg portions of the vehicular seat apparatus of FIG. 1.

The second slide rail unit 12 includes a second stationary rail 35 and a second moving rail 36. The stationary rail 35 extends parallel to the first stationary rail 31. The second moving rail 36 is slidable in its longitudinal direction with respect to the stationary rail 35. The stationary rails 31 and 35 and the moving rails 32 and 36 extend in the front-rear direction of a vehicle body 40 (only a part of which is shown in FIG. 3).

The seat slide device 13 further comprises a first locking mechanism 41 and a second locking mechanism 42. The first locking mechanism 41 fixes the first moving rail 32 in a desired position in the longitudinal direction with respect to the stationary rail 31. The second locking mechanism 42 fixes the second moving rail 36 in a desired position in the longitudinal direction with respect to the stationary rail 35.

Figure 4:
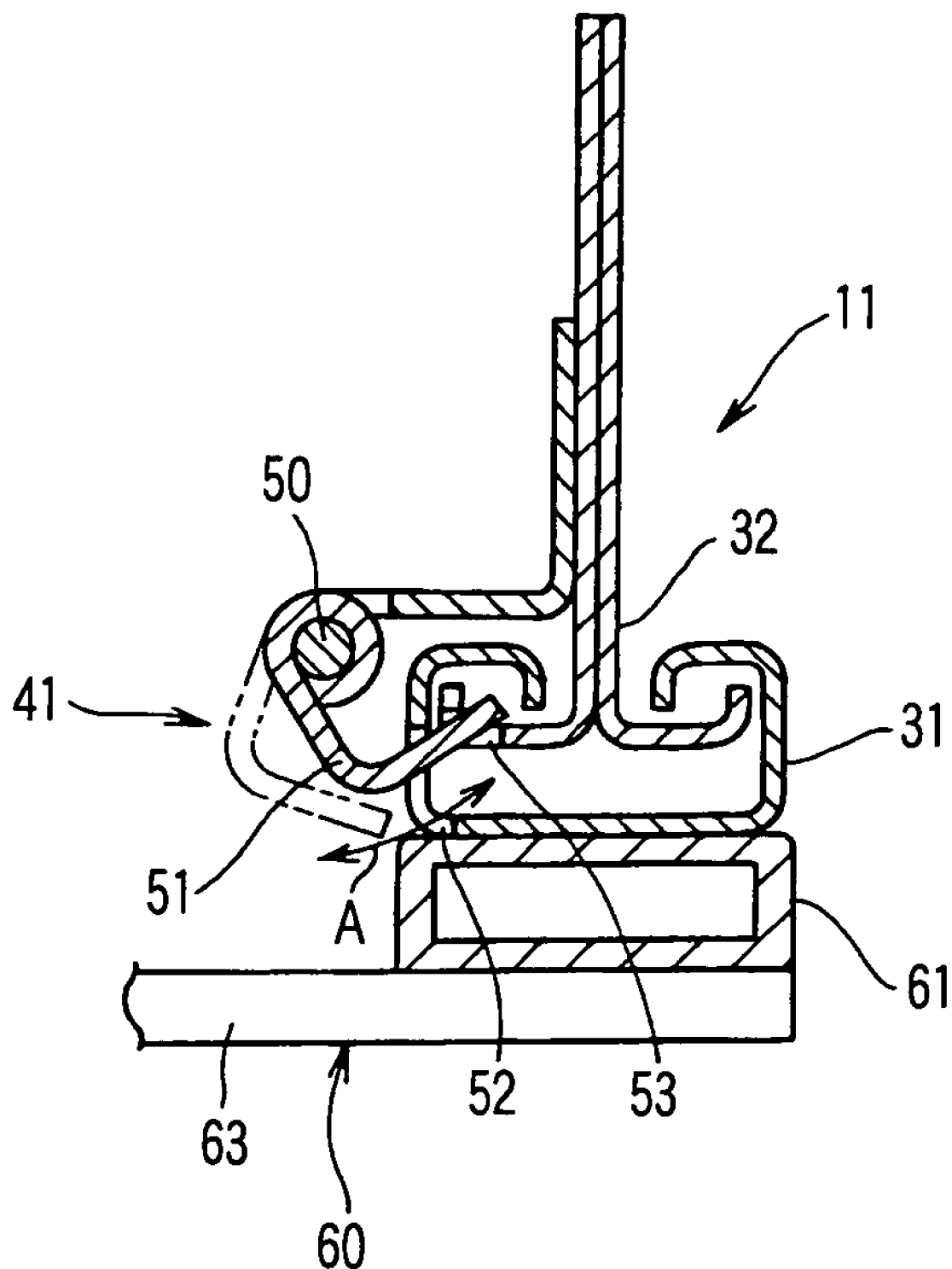
FIG. 4 is a sectional view showing a part of a first slide rail unit of the vehicular seat apparatus of FIG. 1.

FIG. 4 typically shows the first locking mechanism 41, out of the two locking mechanisms 41 and 42. The first locking mechanism 41 has a latch member 51 for locking. The latch member 51 can rotate (in other words "rock") integrally with a rod 50 in the direction of arrow A. If the latch member 51 is inserted into engaging holes 52 and 53 that are formed in the stationary rail 31 and the moving rail 32, respectively, the moving rail 32 is fixed to the stationary rail 31. If the latch member 51 is disengaged from the holes 52 and 53 by manipulating an operating section 55, the moving rail 32 can be slid in the longitudinal direction with respect to the stationary rail 31.

The first and second locking mechanisms 41 and 42 share a configuration in common. The respective latch members 51 of the locking mechanisms 41 and 42 synchronously act in a locking direction and an unlocking (release) direction. If the operating section 55 is manipulated, the latch members 51 of the locking mechanisms 41 and 42 simultaneously act in the unlocking direction.

The seat slide device 13 is provided with a rigid frame 60. The frame 60 connects the first and second stationary rails 31 and 35 to each other. The frame 60 serves to restrain the first and second slide rail units 11 and 12 from relative dislocation.

As shown in FIG. 3, an example of the rigid frame 60 comprises a first frame member 61, second frame member 62, and connecting members 63 and 64. The first frame member 61 is fixed to the underside of the first stationary rail 31. The second frame member 62 is fixed to the underside of the second stationary rail 35. The connecting members 63 and 64 connect the frame members 61 and 62 to each other.

The first frame member 61 extends in the front-rear direction of the vehicle body along the first stationary rail 31. The second frame member 62 extends in the front-rear direction of the vehicle body along the second stationary rail 35. Each of the frame members 61 and 62 is formed of a metallic pipe with a square cross section. Respective opposite end portions 61a and 62a of the frame members 61 and 62 are flattened and thinned.

The connecting members 63 and 64 extend in the crosswise direction of the vehicle body. The respective opposite end portions of the connecting members 63 and 64 are fixed to the frame members 61 and 62 by welding or the like. Fastening parts, such as bolts or rivets, may be used to fix the frame members 61 and 62 and the connecting members 63 and 64.

The stationary rails 31 and 35 of the slide rail units 11 and 12 are fixed to the frame members 61 and 62, respectively, of the rigid frame 60 by welding or fixing means, such as rivets, in a given positional relationship.

Body mounting leg portions 70 are attached individually to the respective front parts of the frame members 61 and 62 of the rigid frame 60 by welding or the like. Body mounting leg portions 71 are also attached individually to the respective rear parts of the frame members 61 and 62. The leg portions 70 and 71 are fixed to a seat attachment portion 40a (only a part of which is shown in FIG. 3) of the vehicle body 40 by means of bolts 72, respectively. The rigid frame 60 is provided between the body mounting leg portions 70 and 71 and the stationary rails 31 and 35.

Load sensors 80a, 80b, 80c and 80d are arranged between the seat cushion assembly 14 and the moving rails 32 and 36. These sensors 80a to 80d have their respective sensing plates for use as strain detecting means. A strain gage is attached to each of the sensing plates.

More specifically, respective body portions 81 of the pair of load sensors 80a and 80b, which are situated on the left-hand side of FIG. 1, are fixed to the first moving rail 32 by means of fixing members 82, such as bolts. Respective pressure receiving portions 83 of the sensors 80a and 80b are fixed to the cushion frame 15 by means of fixing members 84, such as bolts.

Respective body portions 91 of the pair of load sensors 80c and 80d, which are situated on the right-hand side of FIG. 1, are fixed to the second moving rail 36 by means of fixing members 92, such as bolts. Respective pressure receiving portions 93 of the sensors 80c and 80d are fixed to the cushion frame 15 by means of fixing members 94, such as bolts.

The load sensors 80a to 80d are located between the cushion frame 15 and the moving rails 32 and 36. The sensors 80a to 80d output voltages that correspond to seating loads that act on the cushion frame 15 from above. These output voltages are applied to an airbag control unit (ECU) 100 shown in FIG. 1.

The load sensors 80a to 80d are connected to the control unit 100 through a wiring member 102 having connectors 101. Based on detection signals from the sensors 80a to 80d, it is determined whether or not an occupant in a passenger seat is an adult. If the occupant in the passenger seat is concluded to be an adult, the control unit 100 allows a passenger seat airbag (not shown) to expand and actuates its inflator.

In the seat slide device 13 constructed in this manner, the stationary rails 31 and 35 are connected to each other by the rigid frame 60 that undergoes no substantial deformation. Before the seat slide device 13 is attached to the vehicle body, therefore, the relative positions of the slide rail units 11 and 12 can be maintained accurately.

The load sensors 80a to 80d are calibrated before the seat apparatus 10 is attached to the vehicle body. The calibration is carried out with the slide rail units 11 and 12 fixed to the rigid frame 60. The seat apparatus 10 can be attached to the vehicle body without changing the shapes of and positional relations between the seat cushion assembly 14 and the slide rail units 11 and 12 set by the calibration.

After the seat apparatus 10 is attached to the vehicle body, therefore, the zero points of the load sensors 80a to 80d can be maintained without being influenced by variation, if any, in the position of the seat mounting portion 40a (only a part of which is shown in FIG. 3) of the vehicle body or the like. Thus, the seating loads on the seat cushion assembly 14 can be detected accurately.

Further, the slide rail units 11 and 12 can be assembled with the relative positions of the stationary rails 31 and 35 maintained by the rigid frame 60. The body mounting leg portions 70 and 71 are attached to the rigid frame 60 that has high rigidity. Thus, the slide rail units 11 and 12 can be set in predetermined positions in the vehicle body without being influenced by variation in the position of the cushion frame 15 or the seat mounting portion 40a of the vehicle body.

As the two locking mechanisms 41 and 42 are simultaneously manipulated by means of the operating section 55, therefore, a phase difference between the mechanisms 41 and 42 can be restricted to a practicable level, and the problem of half-locking can be avoided. Further, variation of operating force that is attributable to the friction of the respective latch members 51 of the locking mechanisms 41 and 42 can be reduced.

It is to be understood, in carrying out this invention, that the components of the seat apparatus, including the first and second slide rail units 11 and 12, locking mechanisms, seat cushion assembly, rigid frame, body mounting leg portions, etc., may be variously changed or modified without departing from the scope or spirit of the invention. Further, the rigid frame according to the invention may be employed in a seat slider having a power slide mechanism that uses a motor for its drive source, as well as in a manual seat slider.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicular seat apparatus comprising:
   a first slide rail unit including a first stationary rail and a first moving rail slidable in the longitudinal direction thereof with respect to the first stationary rail;
   a second slide rail unit including a second stationary rail located parallel to the first stationary rail and a second moving rail slidable in the longitudinal direction thereof with respect to the second stationary rail;
   a first locking mechanism which fixes the first moving rail in a desired position in the longitudinal direction with respect to the first stationary rail;
   a second locking mechanism which fixes the second moving rail in a desired position in the longitudinal direction with respect to the second stationary rail;
   a seat cushion assembly attached to the first and second moving rails;
   a rigid frame which connects the first and second stationary rails to each other to restrain relative dislocation of the first and second slide rail units; and
   a body mounting leg portion provided on the rigid frame.

2. A vehicular seat apparatus according to claim 1, which further comprises a load sensor which is provided between the seat cushion assembly and the first and second moving rails and detects vertical loads applied to the seat cushion assembly.

3. A vehicular seat apparatus according to claim 1, wherein the rigid frame comprises a first frame member, extending in the front-rear direction of a vehicle body along the first stationary rail and fixed to the underside of the first stationary rail, and a second frame member, extending in the front-rear direction of the vehicle body along the second stationary rail and fixed to the underside of the second stationary rail, and connecting members which extend in the crosswise direction of the vehicle body between the first and second frame members and connect the first and second frame members to each other.

* * * * *